Dec. 24, 1935.  J. H. MOREN  2,025,419

EXTENSION RING FOR CLAY PRESSES

Filed Jan. 31, 1935

INVENTOR
John H. Moren
By Martin T. Manion
ATTORNEY

Patented Dec. 24, 1935

2,025,419

UNITED STATES PATENT OFFICE 2,025,419

EXTENSION RING FOR CLAY PRESSES

John H. Moren, Patton, Pa., assignor to Patton Clay Manufacturing Co., Patton, Pa., a corporation of Pennsylvania Application January 31, 1935, Serial No. 4,280

2 Claims. (Cl. 25—17)

This invention relates broadly to presses for the extrusion of clay products such as sewer pipe, conduit, and the like.

In the production of products of the character referred to clay in a plastic state is introduced within a vertical cylinder and the clay forced downward over an appropriately positioned forming die or bell by a vertically reciprocable plunger. On the upstroke of the plunger the upper surface of the unextruded clay remaining in the cylinder has a tendency to adhere to the face of the plunger and a portion of the clay is elevated therewith, thereby separating the mass of plastic clay contained within the cylinder. Once separated from the mass, it cannot be satisfactorily re-united and the rupture, as a consequence, appears in the product when such separated clay is ultimately extruded.

It is the purpose of the present invention to provide an extension ring to be associated with the clay cylinder, said ring having an interior clay-contacting wall which is so designed or shaped that the unextruded clay is keyed and maintained together in a substantially solid one-piece mass intermediate the plunger and the bell, and is not readily separated from such state by reason of the resistance offered by such mass to the upstroke of the plunger. As a result, little, if any, clay adheres to the face of the plunger on the upstroke of the latter.

In describing the invention in detail, reference is herein had to the accompanying drawing, in which—

Figure 1:
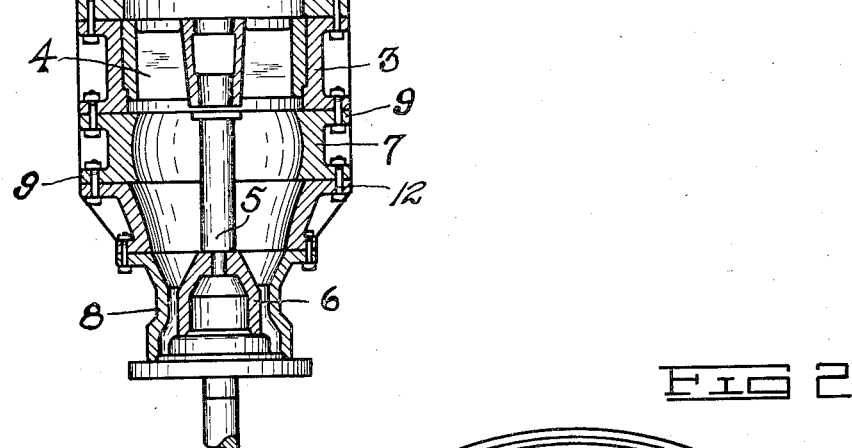
Figure 1 is a vertical sectional view of a portion of a clay press illustrating the application of the ring thereto.

Referring to said drawing, the reference character 1 designates the clay cylinder in which the plunger 2 is vertically reciprocable. Attached to the lower open end of the cylinder 1 is the usual spider ring 3 in which is suspended the spider 4 of the bell rod 5, which latter carries the bell 6 on its lower end.

The extension ring 7, to which the present application specifically relates, is shown in the drawing as being located intermediate the spider ring 3 and bell ring 8, although this location is not vital and the same may readily be positioned at other suitable locations intermediate the cylinder 1 and bell ring 8.

Figure 2:
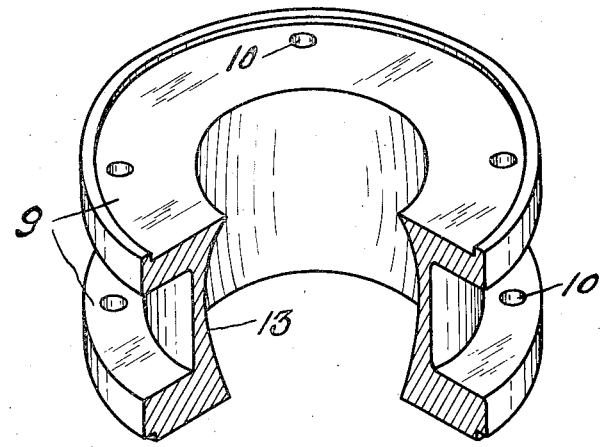
Figure 2 is a perspective view of the ring shown in Fig. 2.

Said ring 7, as is shown in Figs. 1 and 2, consists simply of upper and lower annular flanges 9 designed to occupy interlocking relation with corresponding flanges of abutting rings, said flanges having apertures 10 for the reception of attaching bolts 12.

The inner wall of said ring is preferably concavely curved throughout substantially its entire heighth, as shown at 13, which curvature becomes filled with clay under pressure on the downstroke of the plunger. At the limit of the downstroke of said plunger, the recess remains filled with compacted clay which has a tendency to key the entire mass in an immovable state of sufficient resistance to overcome any tendency of elevation of any part thereof by adherence to the clay-contacting face of the plunger or by reason of any suction resulting from the upstroke. Upon the subsequent downstroke of the plunger, following the introduction of an additional supply of clay to the cylinder, the previously deposited clay is forced downward and out of the ring and a fresh supply of clay is forced into the recess. Clay is forced outward and downward upon the downstroke of the plunger due to the concavity having such a large radius and consequent shallow depth that clay cannot become lodged therein when subjected to the pressure exerted by the downstroke of the plunger.

Figure 3:
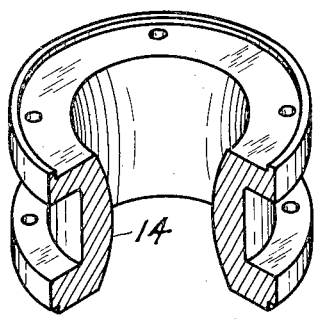
Figure 3 is a perspective view of another form of ring.

In the modification shown in Fig. 3 the irregularity consists of a convexity or annular rib 14 instead of the recess, the rib further compacting the clay and gripping the same in a solid mass to offer resistance to elevating force.

What is claimed is—

1. In a clay press, a clay cylinder, a reciprocating plunger in the cylinder, a forming die associated with and spaced from the cylinder, and a clay retaining ring in said space between the cylinder and die having its inner circumferential wall substantially concavely formed, whereby to receive a substantial mass of clay upon the downstroke of the plunger to prevent disintegration of the mass by the vacuum created by said plunger upon its upstroke.

2. In a clay press, a clay cylinder, a reciprocating plunger in the cylinder, a forming die associated with and spaced from the cylinder, and a clay retaining ring in said space between the cylinder and die having its inner circumferential wall curved in cross section, whereby to receive a substantial mass of clay upon the downstroke of the plunger, the curvature of said wall being such so that the mass of clay is keyed to the ring by a downwardly and outwardly flared portion below the top of the ring so as to retain said mass in a substantially immovable position upon the upstroke of the plunger to prevent disintegration of the mass by the vacuum created by the plunger upon its upstroke.

JOHN H. MOREN.